No. 619,270. Patented Feb. 14, 1899.
E. A. BENNETT.
PLOW.
(Application filed Mar. 25, 1898.)
(No Model.) 2 Sheets—Sheet 2.
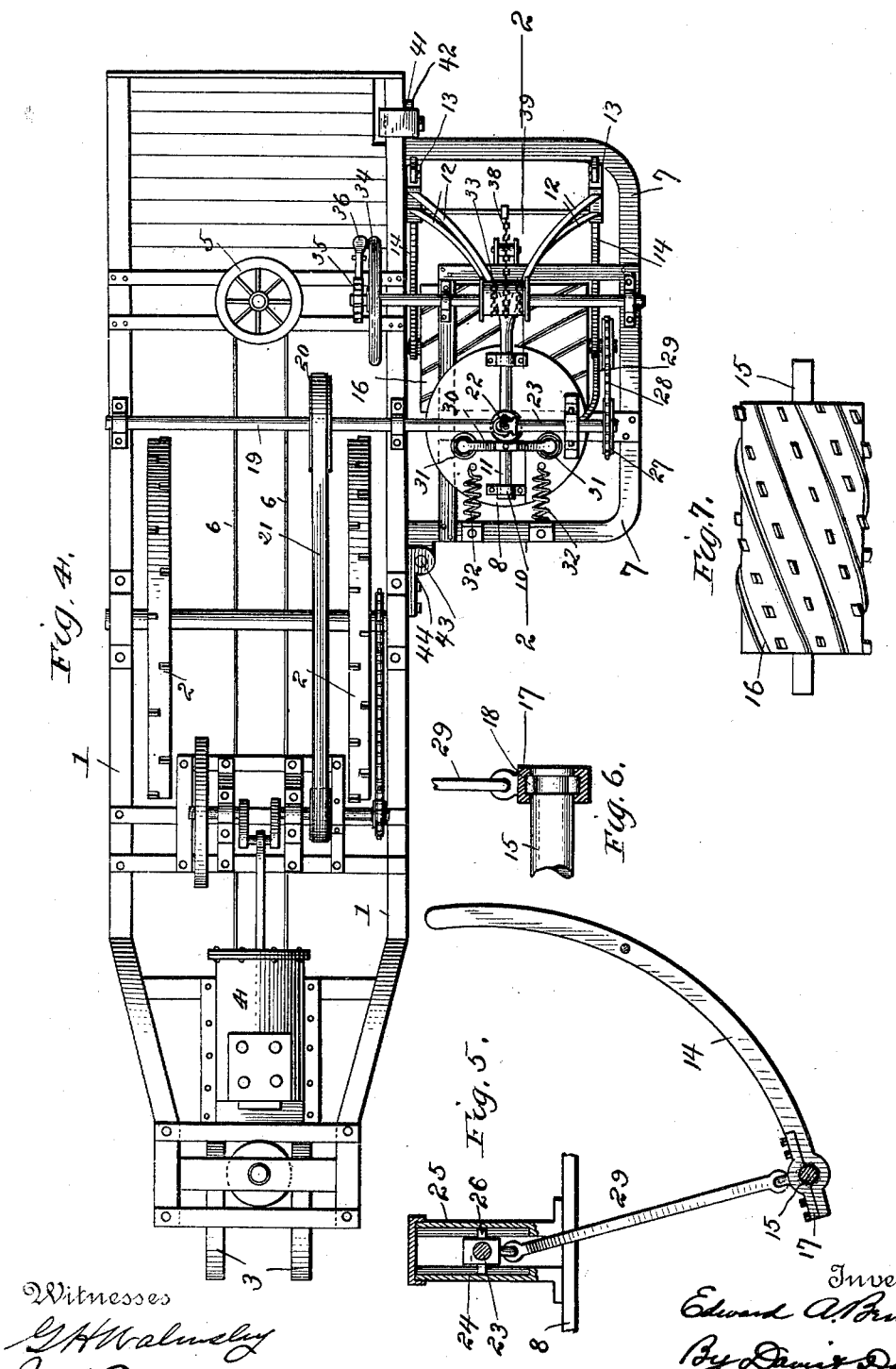
Witnesses
G. H. Walmsley
M. A. Davis
Inventor
Edward A. Bennett
By Davis & Davis
Attorneys

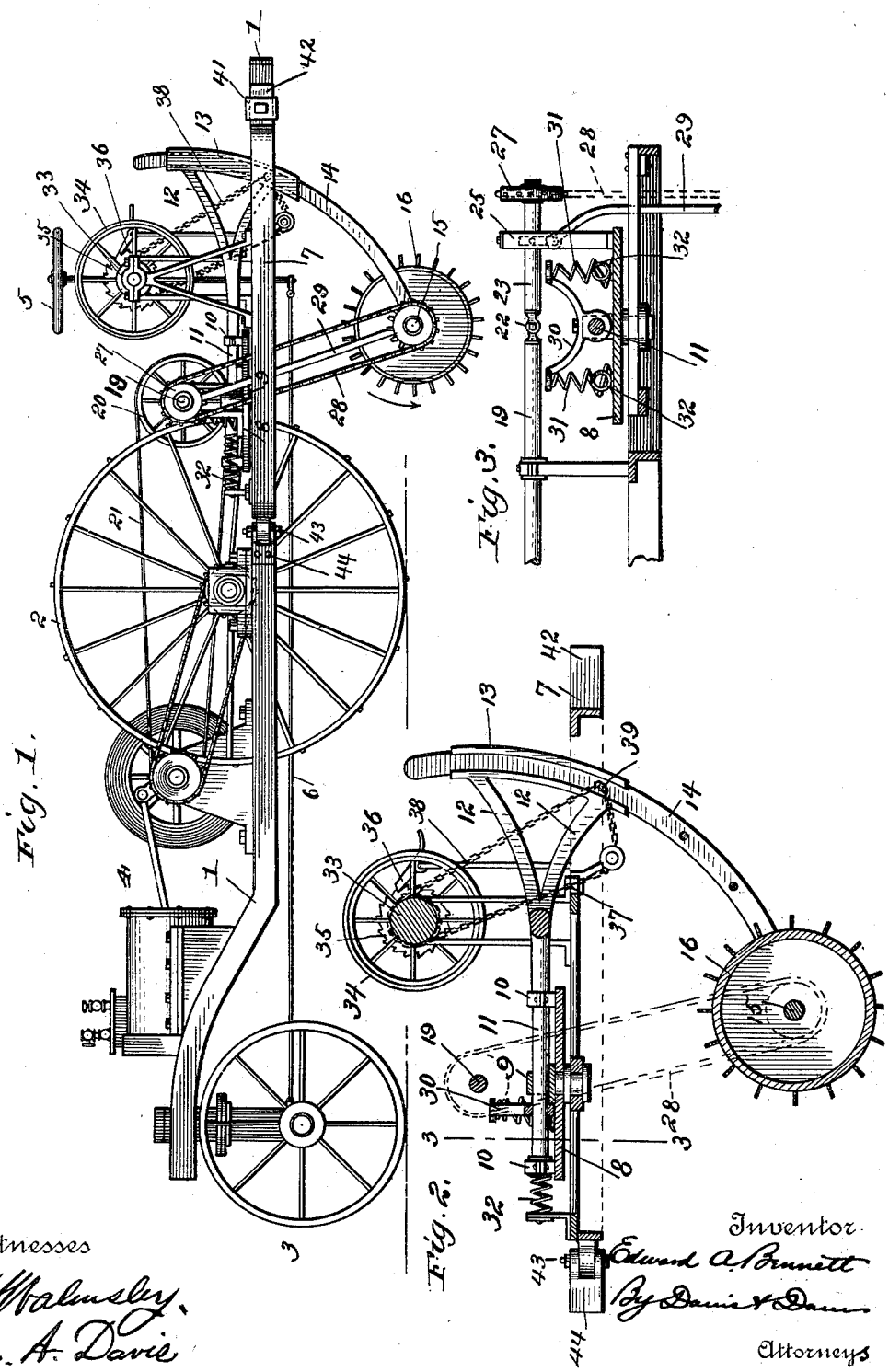

UNITED STATES PATENT OFFICE.

EDWARD A. BENNETT, OF HUNTINGTON, WEST VIRGINIA.

PLOW.

SPECIFICATION forming part of Letters Patent No. 619,270, dated February 14, 1899.

Application filed March 25, 1898. Serial No. 675,142. (No model.)

*To all whom it may concern:*

Be it known that I, EDWARD A. BENNETT, a citizen of the United States, residing at Huntington, in the county of Cabell and State of West Virginia, have invented certain new and useful Improvements in Power-Plows, of which the following is a specification, reference being had therein to the accompanying drawings, in which—

Figure 1 is a side elevation of the plow. Fig. 2 is a longitudinal vertical sectional view of the plowing mechanism, taken on line 2 2 of Fig. 4. Fig. 3 is a detail vertical sectional view taken on line 3 3 of Fig. 2. Fig. 4 is a plan view of the plow complete. Fig. 5 is a detail view. Fig. 6 is a detail sectional view of the journal of the rotary plow, and Fig. 7 is a detail of a modified form of the rotary plow.

The invention relates to improvements in that class of power-plows wherein a rotary plow or cutter is driven by a suitable motor carried on the plow-frame, the whole being mounted on suitable transporting-wheels.

The object of the invention is to provide improved means for supporting and manipulating the plow.

Referring to the various parts by numerals, 1 designates the main frame, supported on suitable transporting traction-wheels 2 and forward steering-wheels 3. On the forward part of the main frame is mounted a suitable motor 4, which may be of any desired form and is connected by a suitable chain-gearing to the axle of the driving or traction wheels 2. At the rear of the main frame is mounted a steering-wheel 5, which is connected by suitable chains or rods 6 with the axle of the steering-wheels.

Extending laterally from the main frame and detachably secured thereto near the rear thereof is a horizontal supplemental frame 7, which carries the plow mechanism. In this frame is mounted a horizontal rotatable disk or platform 8, from the center of which extends upwardly a post 9. Upon the upper side of this disk at opposite points are mounted bearings 10, and supported in these bearings and passing through the post 9 is a rock bar or shaft 11. The rear end of this shaft extends a suitable distance beyond the rear bearing 10 and is formed into two rearwardly-extending diverging arms 12. These arms extend to opposite sides of the frame 7 and each carries at its rear end a curved guide 13, within which slides a correspondingly-curved arm 14, the lower end of which extends forward. In the forward lower ends of these arms is mounted a horizontal transverse shaft 15, which carries the rotary plow 16. To prevent any lateral movement of the shaft through the arms 14, journal-boxes 17 are formed in said arms, and in grooves in these boxes are mounted small rollers 18. In the shaft 14 are formed similar annular grooves of less depth than the rollers and within which said rollers work. As the rollers fit partly within the grooves in the shaft and partly within the journal-box, it will be readily understood that there can be no lateral play of the shaft through said boxes.

To rotate the plow, a shaft 19 is mounted on the frame 1 and is provided with a pulley 20, over which runs a belt 21 from the driving-shaft of the motor. One end of this shaft is extended out over the supplemental frame, and connected to this extended end by a universal joint 23, whose center is directly over the center of the platform 8, is a short section of shaft 23. This section of the shaft passes loosely through a box 24, mounted in standards 25, said box being formed with lateral spindles 26, which fit in vertical grooves formed in the standards, said box being adapted to move up and down in the grooves, as well as to turn on said spindles.

Upon the end of the shaft 23, outside of box 24, is a chain-wheel 27, which is connected by a chain 28 with a similar wheel carried by the shaft of the rotary plow. To maintain these two chain-wheels a constant distance from each other, a rigid bar 29 is secured at one of its ends to the box 24 and at its other end to the adjacent journal-box of the shaft 15.

To maintain the plow normally in a horizontal position, a transverse bar 30 is rigidly secured to shaft 11 forward of post 9, and between each of its upwardly-curved ends and the plate 8 is secured a coil-spring 31, which normally holds said bar in a horizontal position, thereby maintaining the plow in a corresponding position. It will be readily understood, however, that when one end of the plow strikes a stone or other obstruction said end will be raised and the supporting-bar 11 rocked. The rocking of bar 11 will, through the bar 30, compress one spring 31 and extend the other, and said springs will return the plow to its normal position as soon as it has passed over the obstruction. By means of the rigid bar 29 and the flexible connection between the section 23 and shaft 19 the sprocket-wheel 27 will be maintained a constant distance from the sprocket on the plow-shaft and box 24 will be moved up or down and be swung on its spindles to adjust itself to the movements of the shaft 23.

By supporting the plow upon rock-bar 11 and mounting said bar upon the plate 8 said plow is permitted to have a horizontal movement in an arc struck from the center of said plate. This will permit the plow to move rearward from any obstruction it may meet with. In order to bring the plow back to its normal transverse position and to maintain it in said position, springs 32 are secured at one of their ends to the platform 8 and at their other ends to the supplemental frame. These springs extend forward from the platform 8 and one of them is on each side of the bar 11. It will thus be seen that should the plow strike an obstruction it would move upwardly and laterally from it and that when it has passed over said obstruction the two sets of springs would return it to its normal position.

To provide for raising and lowering the plow in order to obtain the desired depth of cut or to raise it from the ground for the purpose of transportation, a windlass 33 is mounted on the supplemental frame and is provided with a hand-wheel 34 and a ratchet-wheel 35, with which a pawl 36 engages. Wound on this windlass in opposite directions are chains 37 and 38, said chains being connected at their other ends to a bar 39, which connects the two curved slides 14. The guides 13 and the curved arms 14 sliding therein are formed on an arc struck from the center of the shaft 19 or its hinged section 23, so that when the plow is raised the centers of the shaft 23 and 15 will remain a constant distance from each other.

Any desired form of rotary plow may be employed, but it is preferred to employ a cylinder provided with a series of spirally-arranged cutting-blades 40. Instead of continuous blades short knives arranged in spiral rows or spike-teeth placed in a similar arrangement may be employed.

The supplemental frame at its rear end is secured to the main frame by means of a sliding sleeve 41, which is adapted to slide over the rearwardly-turned end 42 of the supplemental frame and secure it to the main frame, a bolt securely clamping said sleeve in place and holding the two frames together. At its forward end a removable bolt 43 securely clamps the forwardly-turned end of the frame between the ears of a clip 44. This forms a hinge connection, so that by slipping sleeve 41 off the rear end of the frame and disconnecting the shaft 19 at the joint 22 the supplemental frame may be swung away from the main frame. By removing bolt 43 the whole of the plowing mechanism may be disconnected from the main frame for the purpose of repair or any other purpose.

In operation the plow is held to its work by the operator grasping wheel 34 whenever it is found desirable.

It will be readily understood that if desired any suitable flexible connection may be used instead of the universal joint 22, or a short section of flexible shaft may be substituted for rigid section 23.

Having thus fully described my invention, what I claim, and desire to secure by Letters Patent, is—

1. In a plow, the combination of a frame, a longitudinally-disposed rocking bar supported therein, a transverse rotary plow or pulverizing-cylinder carried by said rocking bar, a plow-operating means carried by the frame, and means for yieldingly holding the rocking bar in its normal position, whereby the rotary plow or pulverizing-cylinder may yield vertically at either of its ends to pass an obstruction and will be returned to its normal position.

2. In a plow, the combination of a frame, an oscillating horizontal support carried by the frame, a longitudinally-disposed rocking bar carried by the oscillating support, means for yieldingly holding the oscillating support in its normal position and for returning it to its normal position after it has been oscillated, means for yieldingly holding the rocking bar in its normal position, a plow-operating mechanism carried by the frame, a plow or pulverizing device carried by the rocking bar, and means for flexibly connecting this device with the plow-operating mechanism.

3. In a plow the combination of a main frame, transporting-wheels, a supplemental frame, means for removably securing said frame to the main frame, said means consisting of a detachable hinge-joint at one end of the frame, and a sliding clamping-sleeve at the other end thereof, a plowing mechanism carried by the supplemental frame, means carried by the main frame for operating the plowing mechanism, said means being detachably connected to the plowing mechanism.

4. In a plow the combination of a supporting-frame, an oscillatory support carried by said frame, a plowing mechanism supported by said support, means for operating the plowing mechanism and means for yieldingly holding the oscillating support in its normal position.

5. In a plow the combination of a frame, a plowing mechanism supported by said frame, a plow-operating means carried by the frame, means for permitting the plow mechanism to yield vertically, means for returning said mechanism to its normal position, and flexible means for connecting the plow-operating means with the plow mechanism.

6. In a plow, the combination of a frame, a transverse rotary plow or pulverizing-cylinder carried by the frame, a horizontal oscillating support for said plow, means for suspending said plow from said support, said means permitting said plow to be raised at either of its ends, means for yieldingly holding said plow in its normal position whereby either end of the cylinder plow or pulverizer may be raised and forced rearward over an obstruction and will be returned to its normal position after it has passed the obstruction.

7. In a plow the combination of a frame, an oscillatory platform supported thereby, a rocking bar carried by said platform, guides carried by said bar, slides operating in said guides, a rotary plow or pulverizing device carried by said slides, a flexible driving-shaft supported on the rotatable platform, means connecting said shaft to the rotary plow or pulverizing device, means for maintaining said shaft and plow or pulverizing device a constant distance from each other, and means for raising and lowering the plow or pulverizing device.

8. In a plow the combination of a frame, an oscillatory platform, supported thereby, a rocking bar mounted thereon, a rotatable plow carried by the said bar, a flexible driving-shaft, a vertically-movable pivoted journal-box carried by the platform and loosely holding the flexible shaft, means connecting the said shaft to the plow, and means for maintaining said shaft and the plow a constant distance from each other.

9. In a plow the combination of a frame, an oscillatory platform therein, a rocking bar supported on said platform, a cross-bar carried by the said bar, springs connected to said bar and to the platform, a rotary plow carried by the rocking bar, a flexible shaft carried by the platform, means connecting this shaft to the rotary plow.

10. In a plow the combination of a frame, guides carried thereby, slides supported by said guides, a shaft mounted in journal-boxes in the lower ends of these slides, said journal-boxes being formed with annular grooves, corresponding grooves being formed in the shaft, rollers fitting said grooves and preventing any lateral movement of the shaft, a rotary plow on the shaft, and a suitable driving mechanism connected to said plow.

11. In a plow, the combination of a frame, a bar carried thereby, guides carried by said bar, vertically-movable slides fitting said guides, a drum carried by the frame, chains connected to said drum and to the slides, means for rotating said drum, means for holding it against rotation, and a plowing device carried by the slides, substantially as described.

In testimony whereof I hereunto affix my signature, in the presence of two witnesses, this 22d day of March, 1898.

EDWARD A. BENNETT.

Witnesses:
WM. R. DAVIS,
G. H. WALMSLEY.